(12) United States Patent
Dey

(10) Patent No.: US 12,311,743 B2
(45) Date of Patent: May 27, 2025

(54) VEHICLE DOOR STRUCTURE

(71) Applicant: NISSAN NORTH AMERICA, INC., Franklin, TN (US)

(72) Inventor: Debraj Dey, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 635 days.

(21) Appl. No.: 17/539,147

(22) Filed: Nov. 30, 2021

(65) Prior Publication Data

US 2023/0166586 A1 Jun. 1, 2023

(51) Int. Cl.
| | |
|---|---|
| *B60J 5/04* | (2006.01) |
| *E05B 77/02* | (2014.01) |
| *E05B 79/06* | (2014.01) |
| *E05B 85/10* | (2014.01) |
| *B60R 21/00* | (2006.01) |

(52) U.S. Cl.
CPC ........... *B60J 5/0456* (2013.01); *B60J 5/0468* (2013.01); *E05B 77/02* (2013.01); *E05B 79/06* (2013.01); *E05B 85/10* (2013.01); *B60R 2021/0055* (2013.01)

(58) Field of Classification Search
CPC ...... B60J 5/0456; B60J 5/0468; B60J 5/0434; B60J 5/0451; B60J 5/0418; B60J 5/0452; B60J 5/0415; B60J 5/0455; B60J 5/0458; B60J 5/0413; B60J 5/0416; E05B 77/02; E05B 85/10; E05B 77/10; E05B 79/06; E05B 77/04; E05B 77/36; E05B 77/38; B60R 2021/006; B60R 21/055
USPC ....... 296/146.6; 49/440, 352, 349, 348, 460, 49/502
See application file for complete search history.

(56) References Cited

U.S. PATENT DOCUMENTS

| | | | |
|---|---|---|---|
| 11,260,731 B2* | 3/2022 | Itou ........................ | B60J 5/0418 |
| 2008/0246309 A1* | 10/2008 | Abe ....................... | B60J 5/0451 |
| | | | 296/187.05 |
| 2020/0248488 A1* | 8/2020 | Muta ...................... | B60J 5/0429 |
| 2021/0237543 A1 | 8/2021 | Itou et al. | |

* cited by examiner

*Primary Examiner* — Dennis H Pedder
(74) *Attorney, Agent, or Firm* — Global IP Counselors, LLP

(57) ABSTRACT

A vehicle door structure includes inner and outer door panels, a door handle assembly and an impact pad. The inner door panel has an access opening that extends from an inboard surface to an outboard surface. The door handle assembly has a base portion overlaying an inboard surface of the outer door panel within a door cavity and a lever portion extending along an outboard surface of the outer door panel. The impact pad has a block portion and a projecting portion that extends from the block portion. The block portion overlays and contacts a portion of the outboard surface of the inner door panel adjacent to the access opening. The block portion is in vertical alignment with a portion of the base portion of the door handle. The projecting portion spans a horizontally measured width of the access opening.

14 Claims, 13 Drawing Sheets

VEHICLE DOOR STRUCTURE

BACKGROUND

Technical Field

The present disclosure generally relates to vehicle door structure. More specifically, the present disclosure relates to a vehicle door structure includes various structure elements that define an impact receiving path that ensures that a door handle assembly of the door undergoes minimal deformation during an impact event where impact force is applied to the vehicle door structure proximate the door handle assembly.

Background Information

Vehicles are continuously being redesigned to redirect the flow of impact forces during an impact event to reduce undesired effects of such impact events.

SUMMARY

One object of the present disclosure is to provide a vehicle door structure with an impact directing structure that reduces deformation of a door handle assembly during an impact event where impact force is applied to an area of the door proximate the door handle assembly.

In view of the state of the known technology, one aspect of the present disclosure is to provide a vehicle door structure with an inner door panel, and outer door panel, a door handle assembly and an impact pad. The inner door panel has an inboard surface and an outboard surface with an access opening that extends from the inboard surface to the outboard surface. The inner door panel also has an outer periphery. The outer door panel has an inboard surface and an outboard surface with a handle opening that extends from the inboard surface to the outboard surface. The outer door panel is fixed to a corresponding outer periphery of the inner door panel defining a cavity therebetween. The door handle assembly has a base portion overlaying the inboard surface of the outer door panel within the cavity and a lever portion extending along the outboard surface of the outer door panel. The impact pad has a block portion and a projecting portion that extends from the block portion. The block portion overlays and contacts a portion of the outboard surface of the inner door panel adjacent to the access opening. The block portion is in vertical alignment with a portion of the base portion of the door handle and the projecting portion spanning a horizontally measured width of the access opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
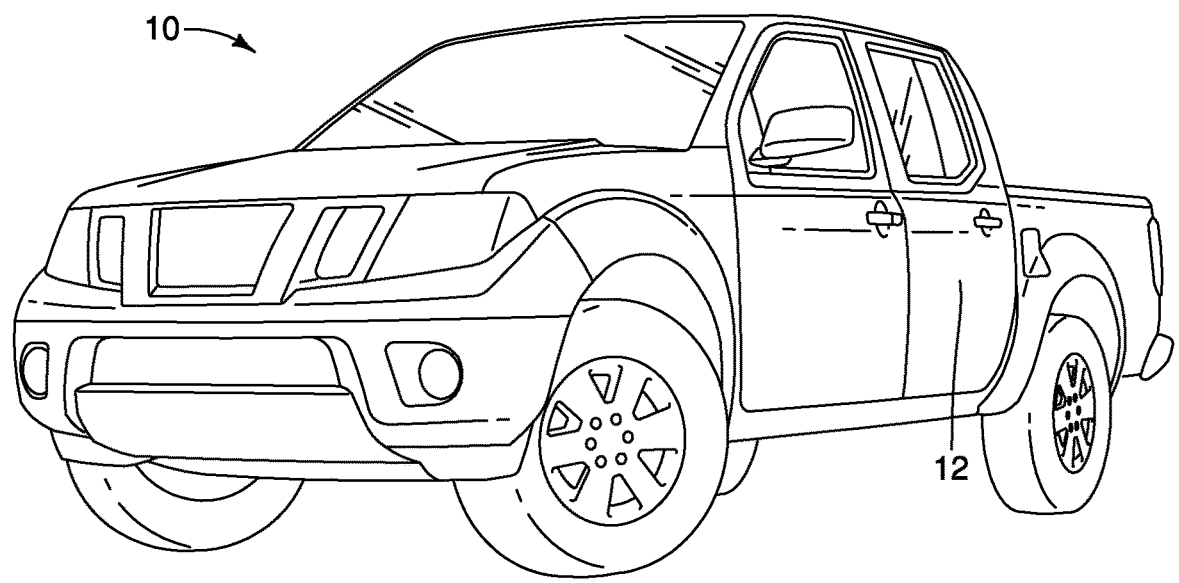
FIG. 1 is a perspective view of a vehicle that includes a rear door in accordance with an exemplary embodiment.
Figure 2:
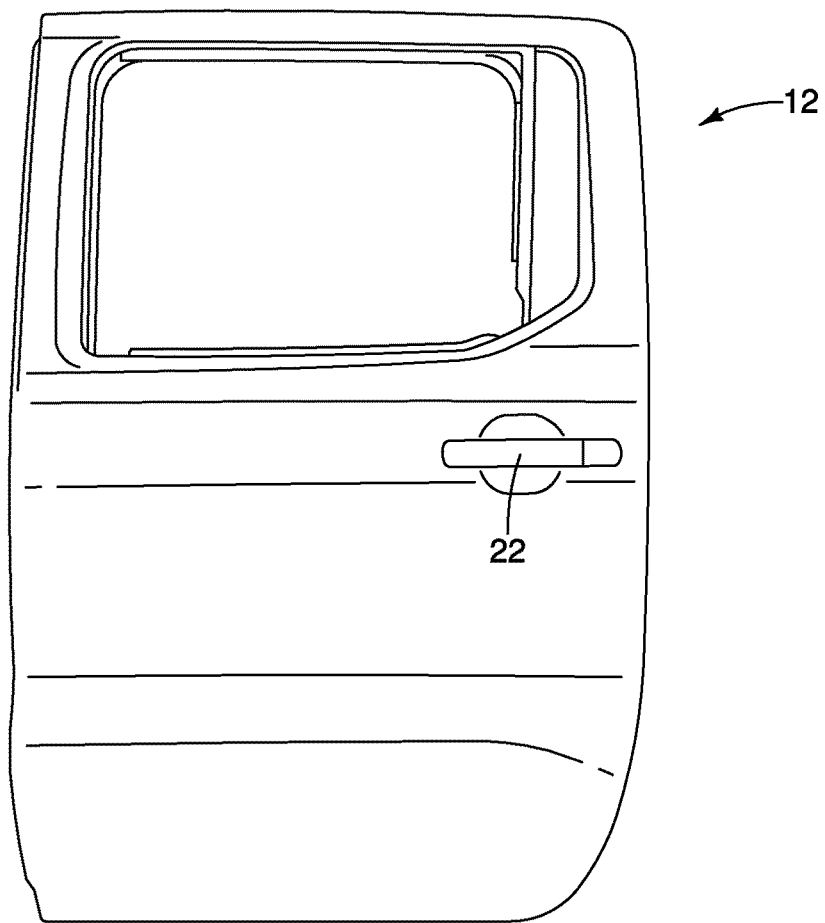
FIG. 2 is a side view of the rear door shown removed from the vehicle in accordance with the exemplary embodiment.

Referring initially to FIG. 1, a vehicle 10 is illustrated in accordance with a first embodiment. The vehicle 10 has a rear door 12 (FIGS. 1 and 2) that includes an impact pad 14 (shown in FIG. 3), as described in greater detail below.

Figure 3:
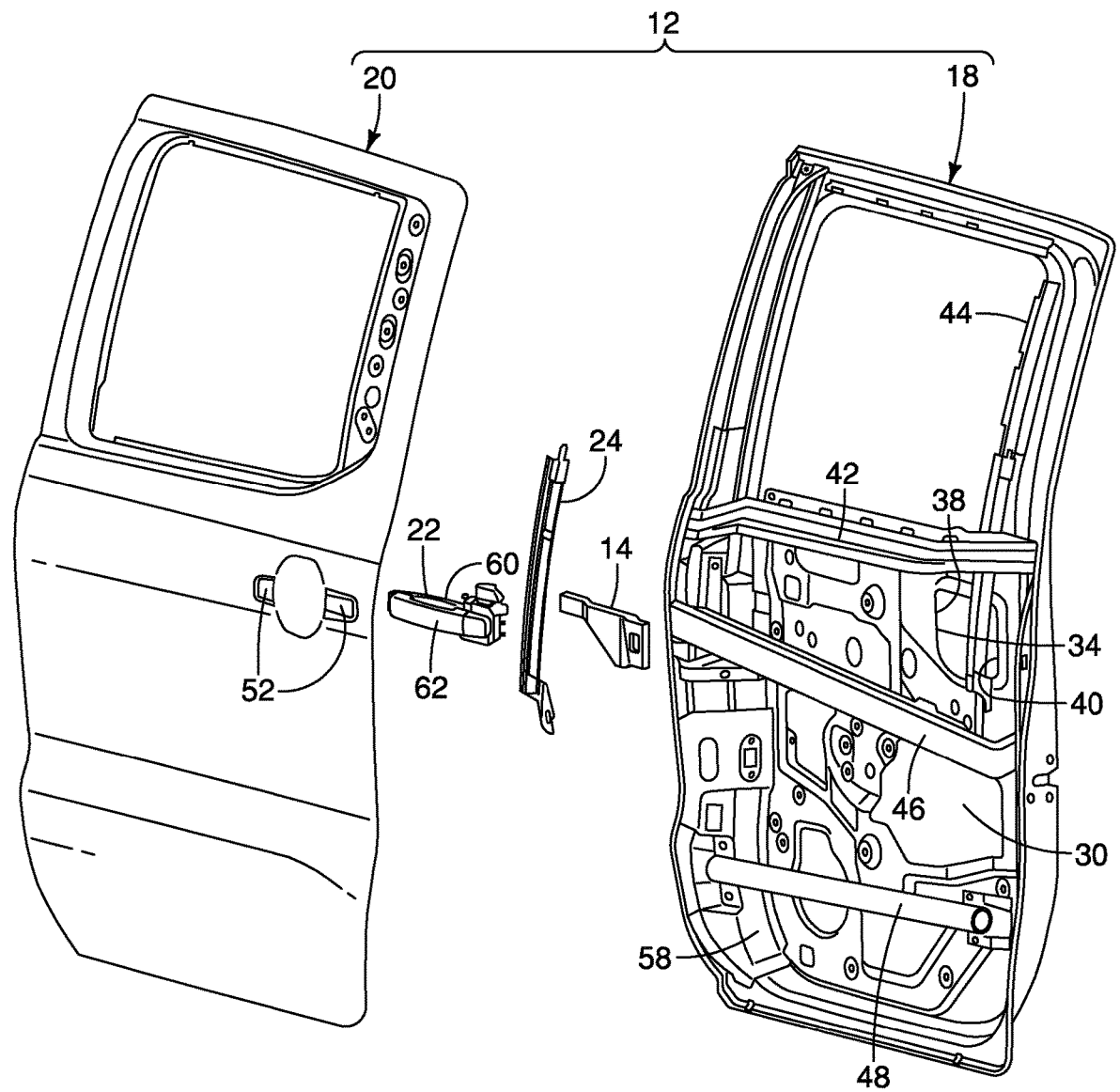
FIG. 3 is a perspective exploded view of the rear door showing an outer door panel, a door handle assembly, a window track, an impact pad 14 and an inner door panel in accordance with the exemplary embodiment.
Figure 4:
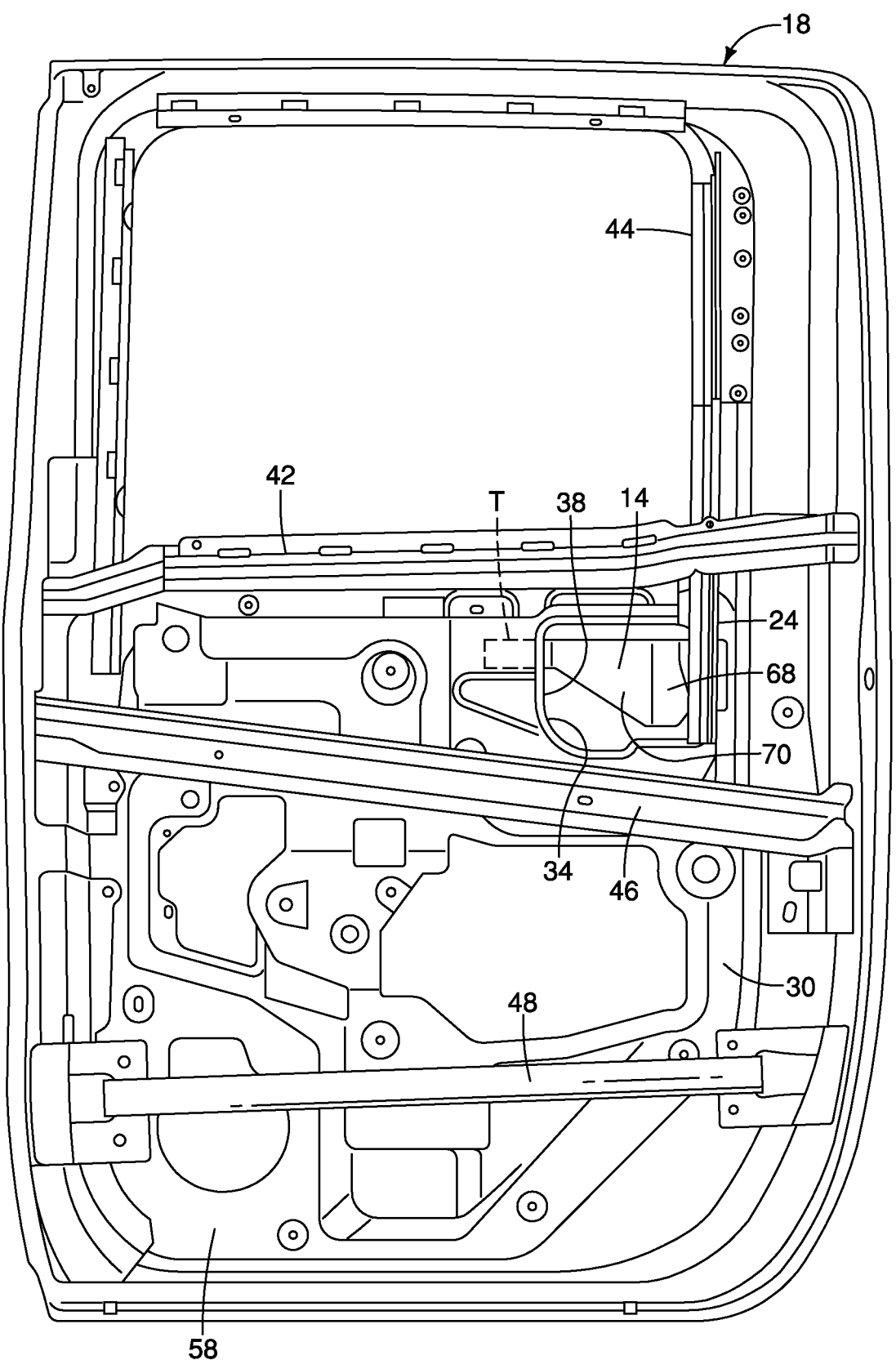
FIG. 4 is a side view of the rear door with the outer door panel removed showing the impact pad installed to the inner door panel with a portion of the window track being outboard from a block portion of the impact pad in accordance with the exemplary embodiment.

As shown in FIG. 3, the rear door 12 (a vehicle door structure) includes an inner door panel 18, an outer door panel 20, a door handle assembly 22, a window track 24 and the impact pad 14.

A description of the inner door panel 18 is now provided with specific reference to FIGS. 3-8. The inner door panel 18 has an inboard surface 30 (FIGS. 3-6) and an outboard surface 32 (FIGS. 7 and 8) with an access opening 34 that extends from the inboard surface 30 to the outboard surface 32. The inner door panel 18 has an outer periphery 36. The access opening 34 is defined by at least a forward edge 38 and a rearward edge 40.

Figure 5:
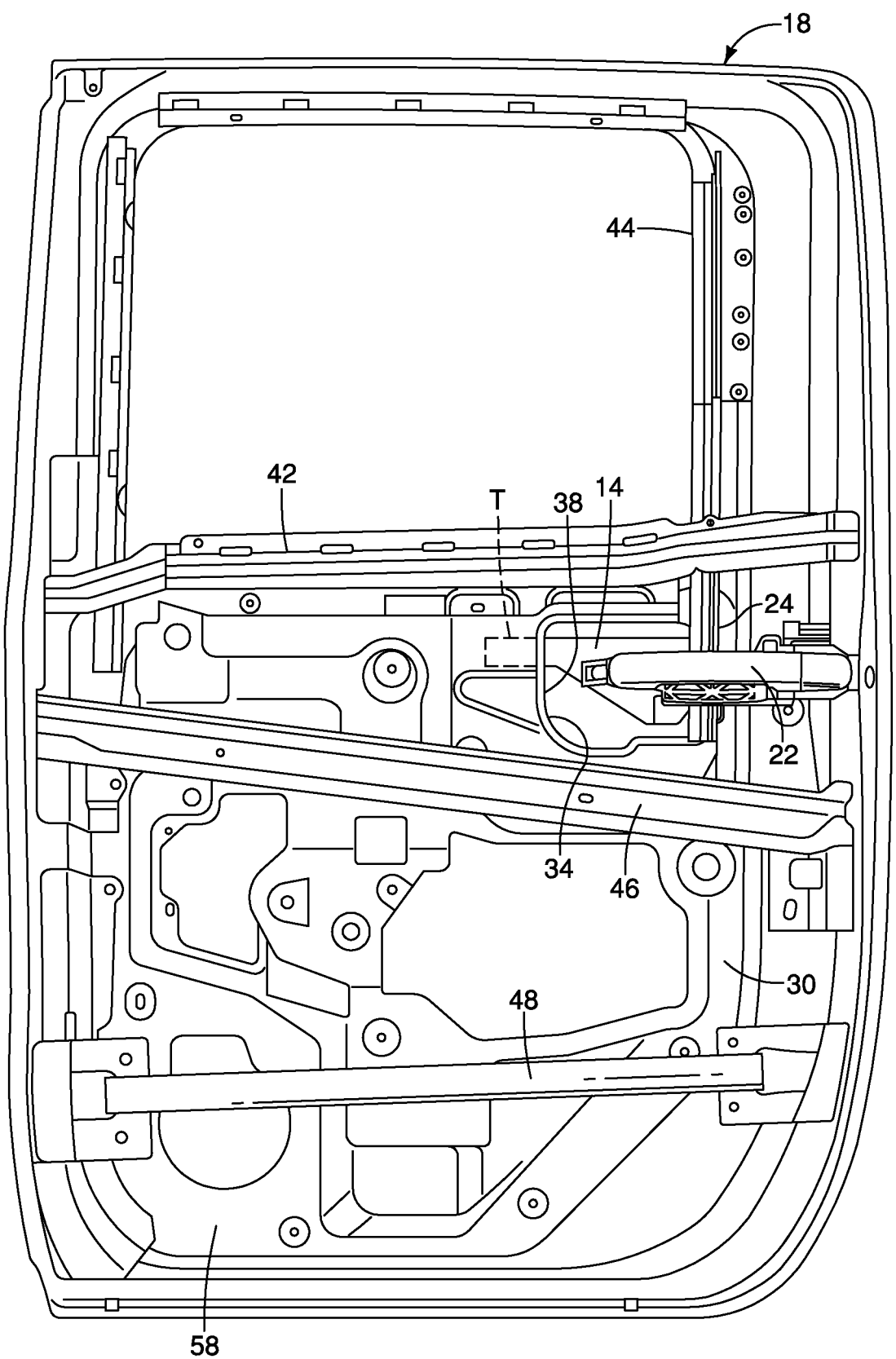
FIG. 5 is another side view of the rear door with the outer door panel removed showing the impact pad installed to the inner door panel, the window track being outboard from the block portion of the impact pad and the door handle assembly being outboard and overlaying the impact pad and the window track in accordance with the exemplary embodiment.
Figure 6:
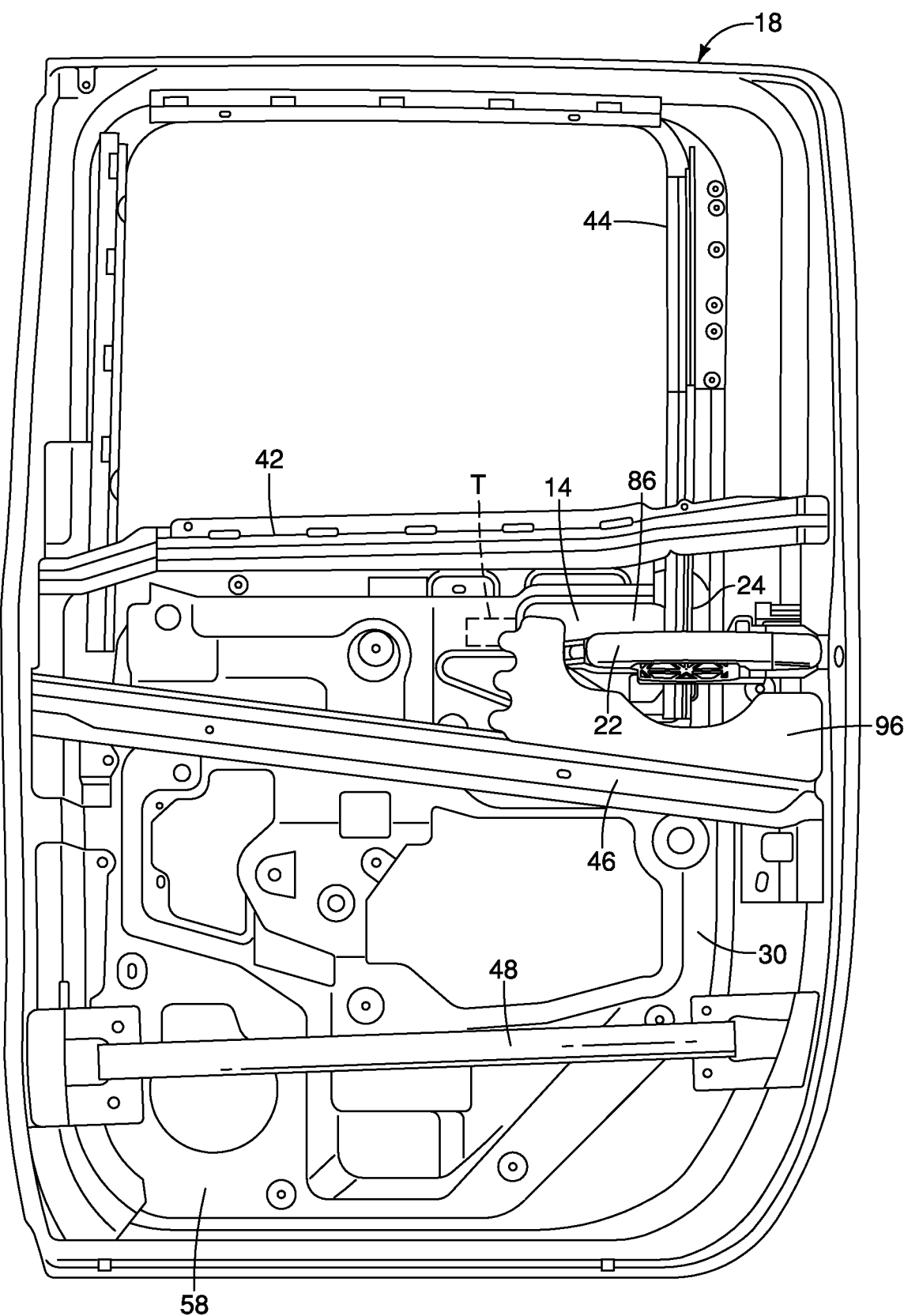
FIG. 6 is yet another side view of the rear door with the outer door panel removed showing the impact pad installed to the inner door panel, the window track outboard from the impact pad, the door handle assembly that is outboard of the window track and a mastic material being located on an inboard surface of the outer door panel (not shown) and spaced apart from the door handle assembly in accordance with the exemplary embodiment.
Figure 7:
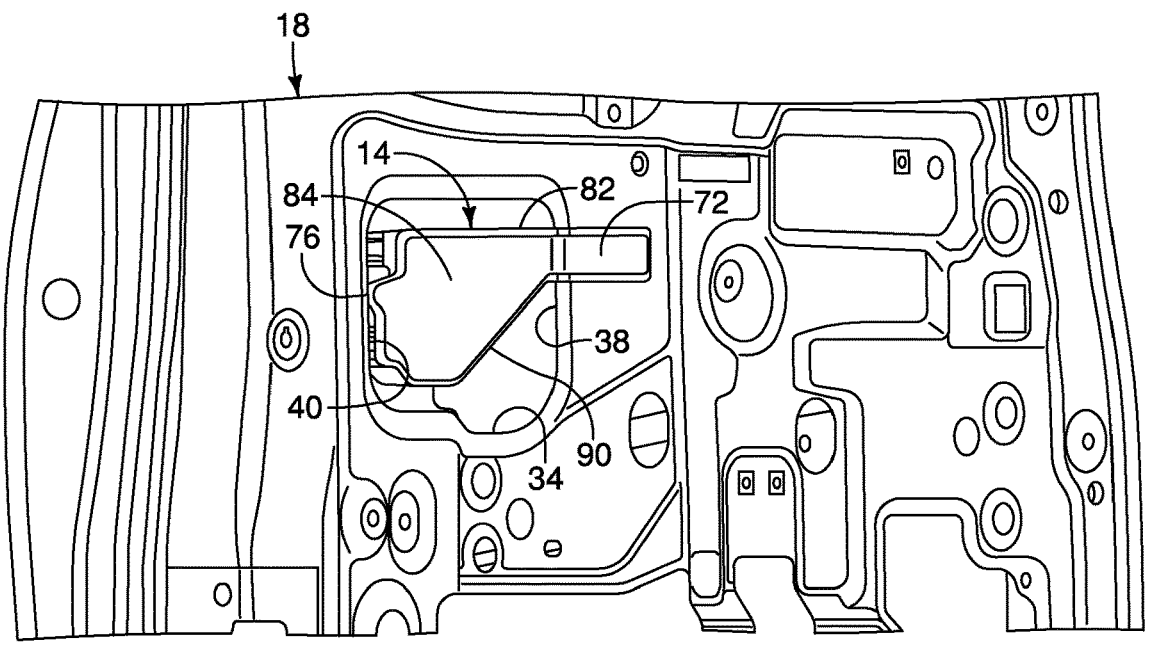
FIG. 7 is a perspective view of an inboard surface of the inner door panel showing the block portion and a projecting portion of the impact pad, the block portion being retained by a rearward edge of an access opening in the inner door panel and double sided tape installed to an outboard side of the projecting portion of the impact pad in accordance with the exemplary embodiment.
Figure 8:
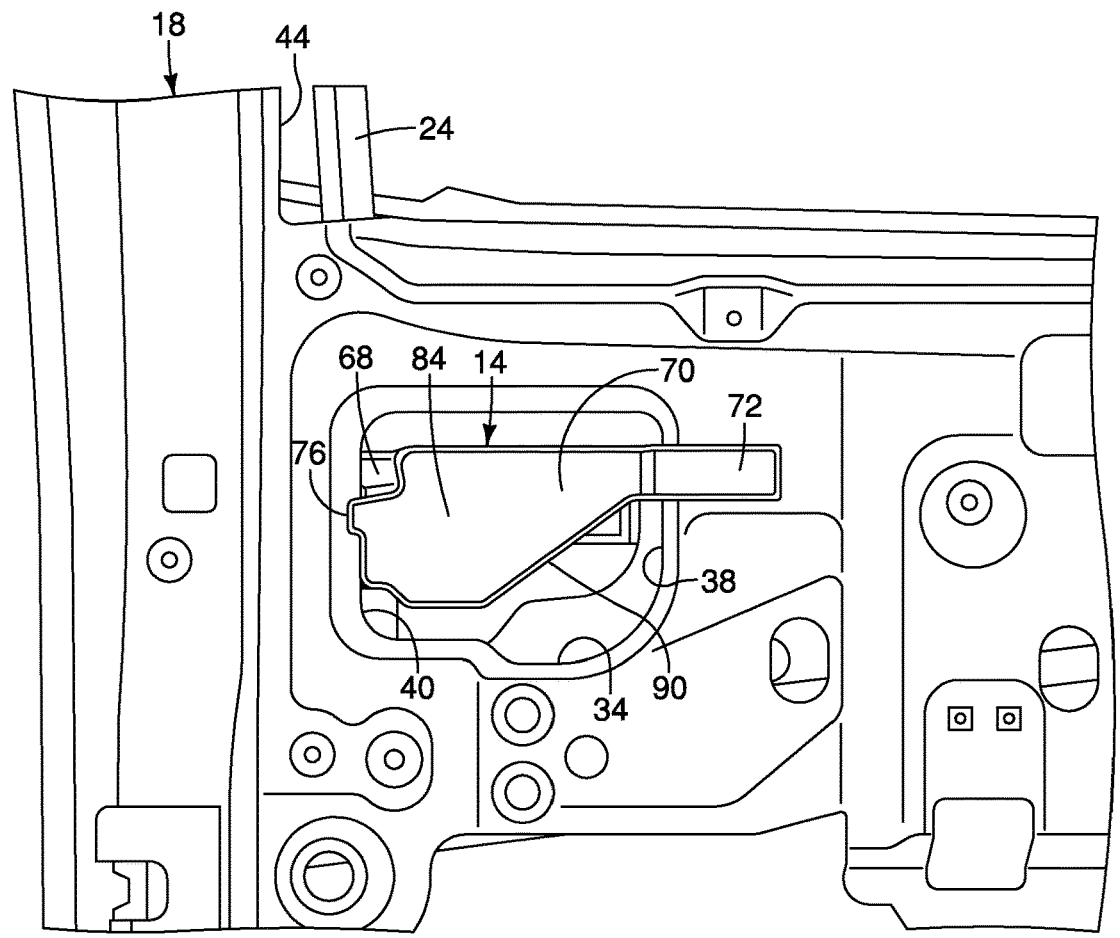
FIG. 8 is a side view of the inboard surface of the inner door panel showing the block portion and the projecting portion of the impact pad, the block portion being retained by the rearward edge of the access opening in the inner door panel and double sided tape installed to the outboard side of the projecting portion of the impact pad in accordance with the exemplary embodiment.
Figure 9:
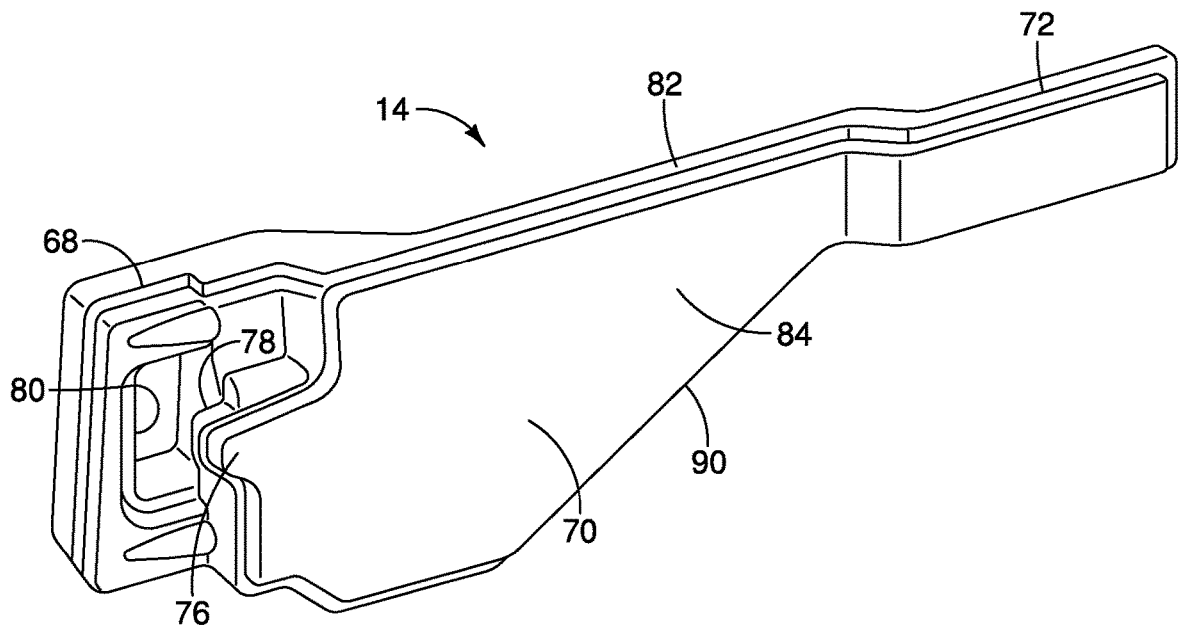
FIG. 9 is a perspective view of the impact pad removed from the rear door in accordance with the exemplary embodiment.

The inner door panel 18 also includes an upper brace 42 that borders a lower edge of a window opening 44, a mid-reinforcement bracket 46 and a lower brace 48. The upper brace 42, the mid-reinforcement bracket 46 and the lower brace 48 all extend from a forward portion of the inner door panel 20 to a rearward portion of the inner door panel 20 and are welded thereto in a conventional manner. As shown in FIGS. 5 and 6, the door handle assembly 22 is located between the mid-reinforcement bracket 46 and the lower brace 48. Further the impact pad 14 is also located between the mid-reinforcement bracket 46 and the lower brace 48.

The outer door panel 20 has an inboard surface (not shown) and an outboard surface 50. A pair of handle openings 52 extend from the inboard surface to the outboard surface 50. The outer door panel 20 also has an outer periphery 56 that is fixed to the corresponding outer periphery 36 of the inner door panel 18. A hollow area or cavity 58 is defined therebetween.

A window regulator (not shown) is installed within the cavity 58. The window regulator includes at least one window track 24 that extends vertically between the door handle assembly 22 and a portion of the impact pad 14, as is described further below. Since window regulators are conventional mechanisms, further description of the window regulator is omitted for the sake of brevity.

The door handle assembly 22 has a base portion 60 and a lever portion 62. The base portion 60 overlays the inboard surface (not shown) of the outer door panel 20 within the cavity 58. The lever portion 62 extends along the outboard surface 50 of the outer door panel 20 and pivots relative to the base portion 62 in order to open the rear door 12 in a conventional manner.

A description of the impact pad 14 is now provided with specific reference to FIGS. 7-12. The impact pad 14 has a block portion 68, a mid-section 70 and a projecting portion 72. The block portion 68 includes an attachment portion 76 that defines a slot 78 that is located between the block portion 68 and the attachment portion 76. Basically, the attachment portion 76 is a rearwardly extending projection (rearward relative to the vehicle 10).

Figure 10:
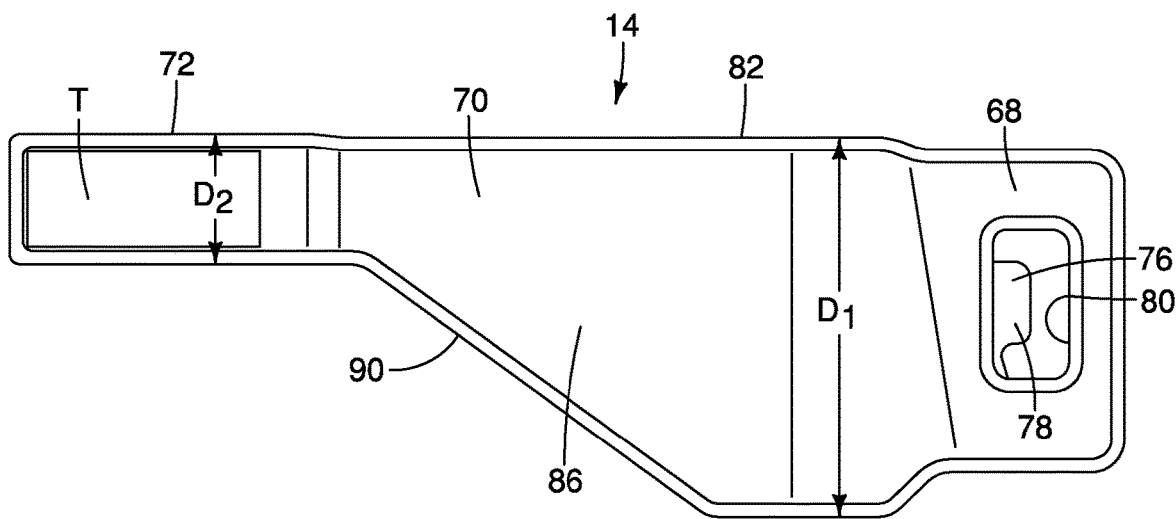
FIG. 10 is a side view of an outboard side of the impact pad removed from the rear door in accordance with the exemplary embodiment.
Figure 11:
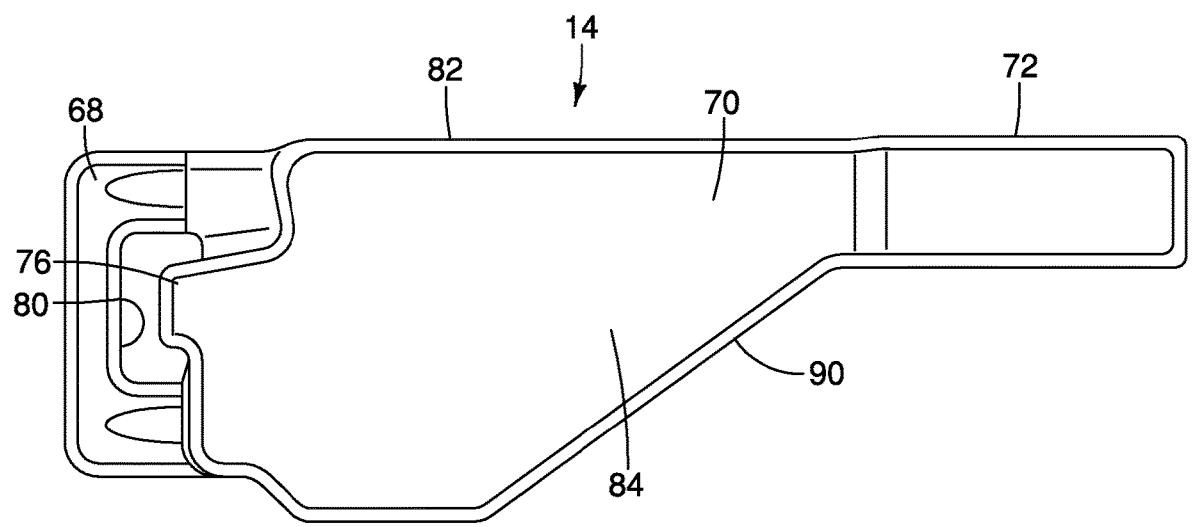
FIG. 11 is a side view of an inboard side of the impact pad removed from the rear door in accordance with the exemplary embodiment.
Figure 12:
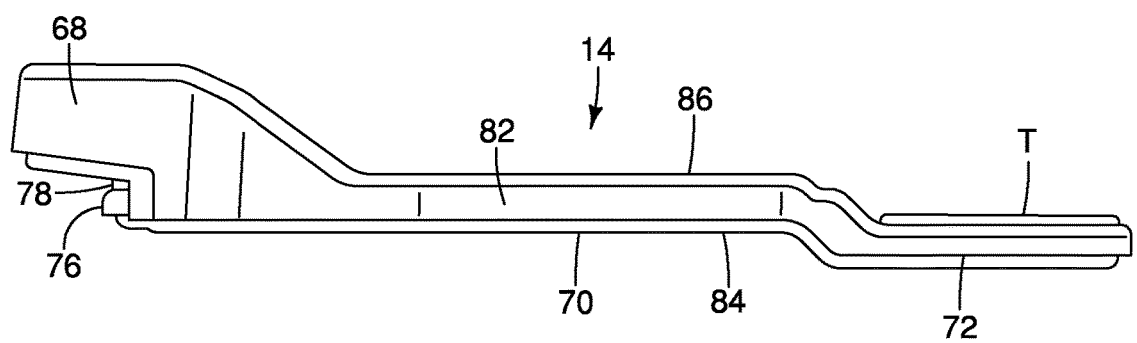
FIG. 12 is a top view of the impact pad removed from the rear door in accordance with the exemplary embodiment.

The mid-section 70 and the projecting portion 72 also extend from the block portion 68 in a vehicle forward direction from the block portion 68. The block portion 68 is further formed with an opening 80. As shown in FIG. 10, the attachment portion 76 is visible through the opening 80 of the block portion 68.

The impact pad 14 has a flat upper edge 82, an inboard side 84 and an outboard side 86. The projecting portion 72 of the impact pad 14 extends forward (relative to vehicle 10) from the block portion 68 and has an attachment surface with double sided tap T that attaches to a portion of the inboard surface 30 of the inner door panel 18 adjacent to the access opening 34.

The mid-section 70 of the impact pad 14 has a lower surface 90 (also referred to as the inclined surface 90) that is inclined and extends downward from the lower edge of the projecting portion 72 to the lower edge of the block portion 68.

The block portion 68 of the impact pad 14 has a first vertical dimension $D_1$ measured from the upper edge 82 downward and the projecting portion 72 of the impact pad has a second vertical dimension $D_2$ measured from the upper edge 82 downward that is less than half of the first vertical dimension $D_1$ such that a lower edge of an attachment portion (the tape T) of the projecting portion 72 is vertically above a lower edge of the block portion 68.

The impact pad 14 is typically installed to the inner door panel 18 from an inboard side of the impact pad 14. Initially, the block portion 68 is partially inserted into the access opening 34 of the inner door panel 18 such that the slot 78 defined between the block portion 68 and the attachment portion 76 is fitted to the rearward edge 40 of the access opening 34. In other words, the rearward edge 40 of the access opening 34 extends into the slot 78 upon installation of the impact pad 14 to the inner door panel 18. Next, the projecting portion 72 is pressed against a portion of the inboard surface 30 of the inner door pane 18 adjacent to the access opening 34. At this time, the double sided tape T contacts the portion of the inboard surface 30 of the inner door pane 18 adjacent to the access opening 34 adhering to the inboard surface 30 and retaining the impact pad 14 in position.

Hence, a portion of the block portion 68 of the impact pad 14 overlays and contacts a portion of the outboard surface 32 of the inner door panel 18 adjacent to the access opening 34. Once the impact pad 14 is installed, the block portion 68 is preferably in vertical alignment with a portion of the base portion 60 of the door handle assembly 22, as shown in FIGS. 5-6, 16-17, 19 and 21. Further the mid-portion 68 and the projecting portion 72 span a horizontally measured width of the access opening 34.

The base portion 60 of the door handle assembly 22 includes an optional spacer material 94. Most conventional base portions 60 of the door handle assembly 22 have a horizontal thickness is not thick enough to function with the impact pad 14. The optional spacer material 94 provides additional horizontal thickness to the base portion 60. The spacer material 94 can be in the form of added webbing that extends the horizontal thickness of the base portion 60, as shown in FIGS. 16-19. Alternatively, the spacer material 94 can be a separate plate (not shown) having the desired thickness that is fixed to the inboard side of the base portion 60.

With the impact pad 14 installed to the inner door panel 18, a portion of the block portion 68 of the impact pad 14 is located along the outboard surface 32 of the inner door panel 18. Also, at least a portion of the attachment portion 76 extends along the inboard surface 30 of the inner door panel 18.

Figure 13:
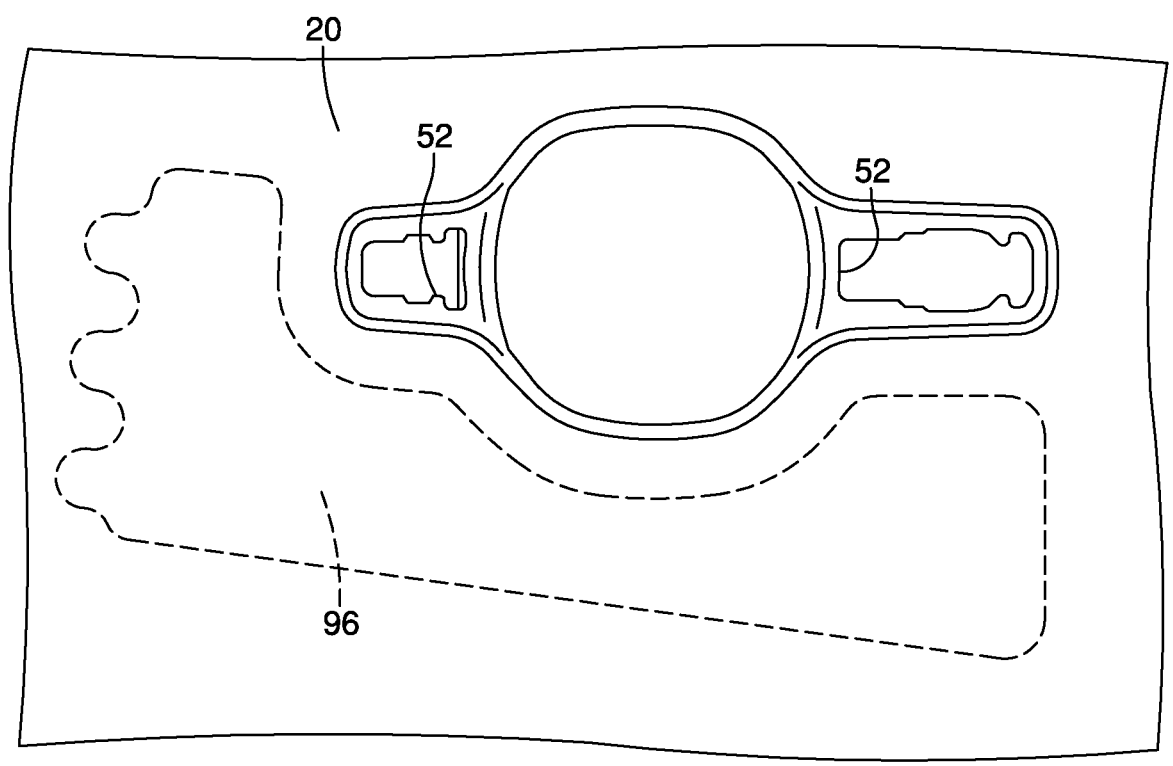
FIG. 13 is a side view of a portion of an outboard side of the outer door panel showing a lever portion of the door handle assembly in accordance with the exemplary embodiment.
Figure 14:
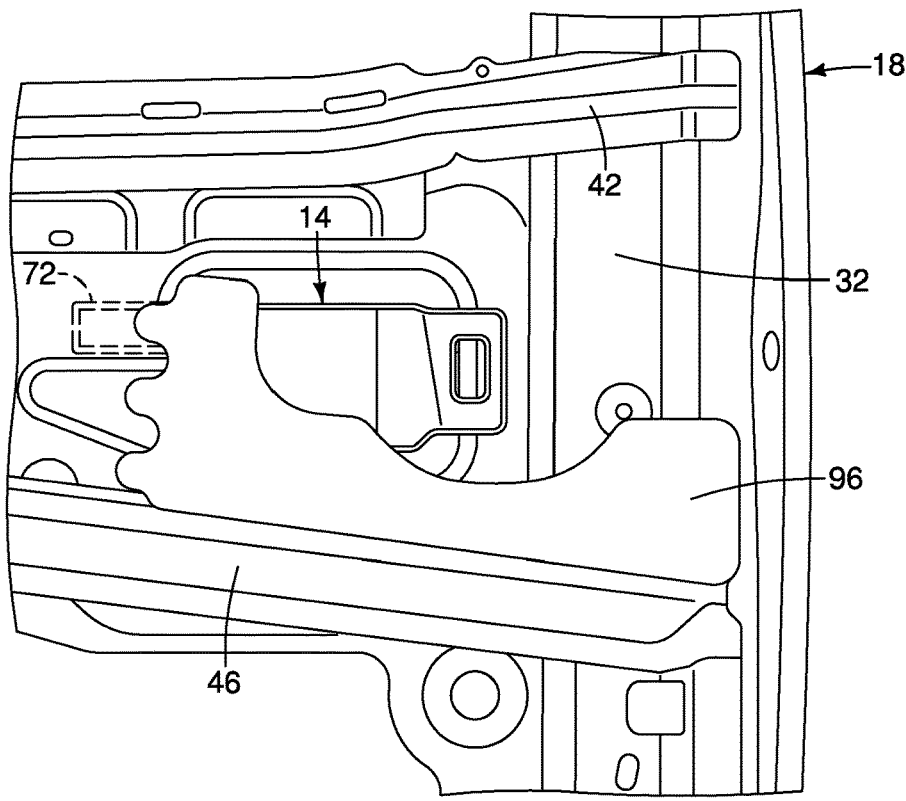
FIG. 14 is a side view of the outboard surface of the inner door panel showing the impact pad installed to the inner door panel with the mastic material of the outer door panel superimposed over the impact pad in accordance with the exemplary embodiment.
Figure 15:
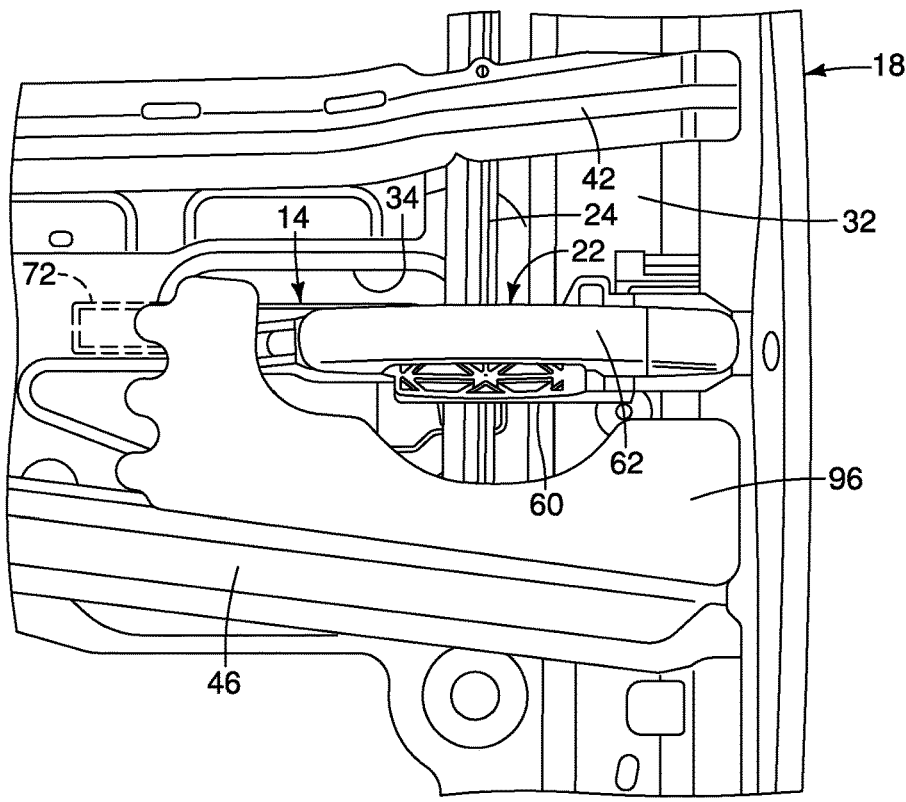
FIG. 15 is another side view of the outboard surface of the inner door panel similar to FIG. 14 showing window track and the door handle assembly installed outboard from the impact pad with the mastic material of the outer door panel superimposed over the impact pad and the window track in accordance with the exemplary embodiment.
Figure 16:
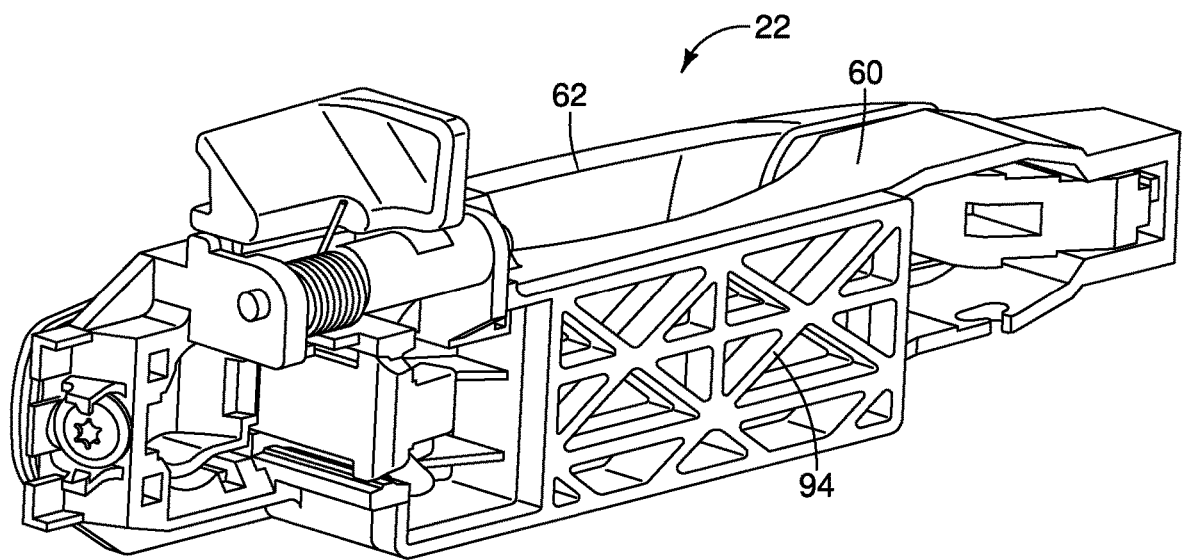
FIG. 16 is a perspective view of an inboard side of the door handle assembly showing a spacer material of a base portion of the door handle assembly in accordance with the exemplary embodiment.
Figure 17:
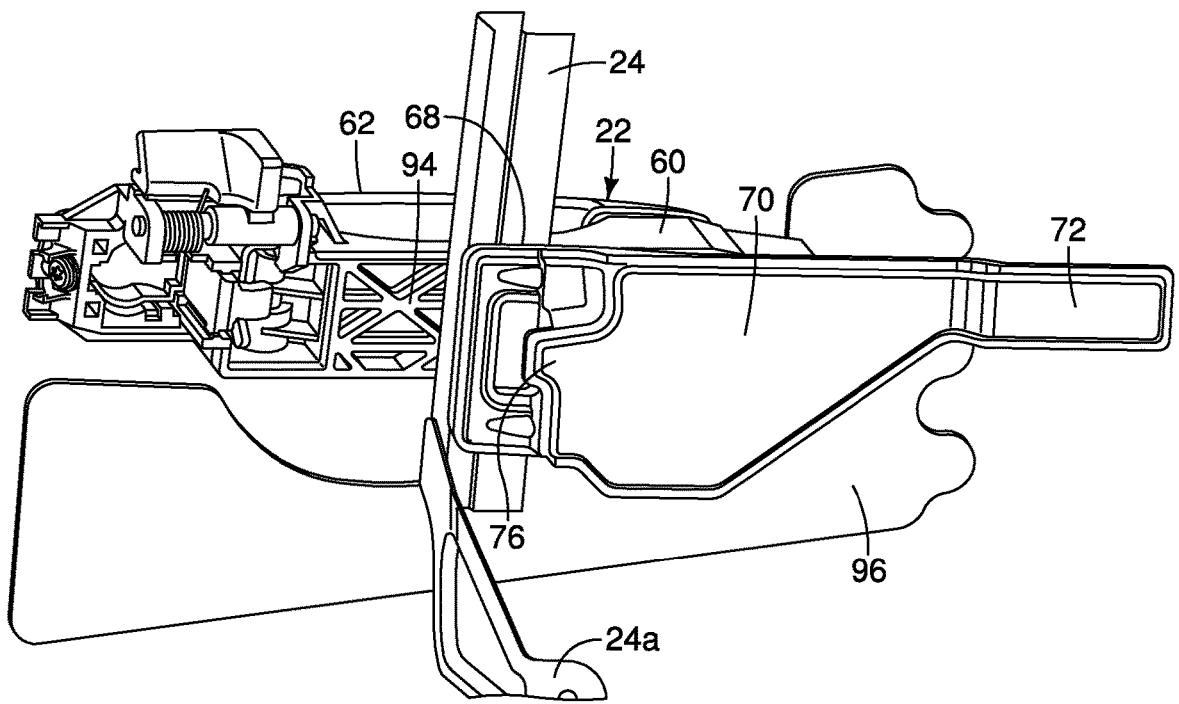
FIG. 17 is a perspective view of the inboard surface of the inner door panel showing window track and the door handle assembly installed outboard from the impact pad with the mastic material of the outer door panel in accordance with the exemplary embodiment.
Figure 18:
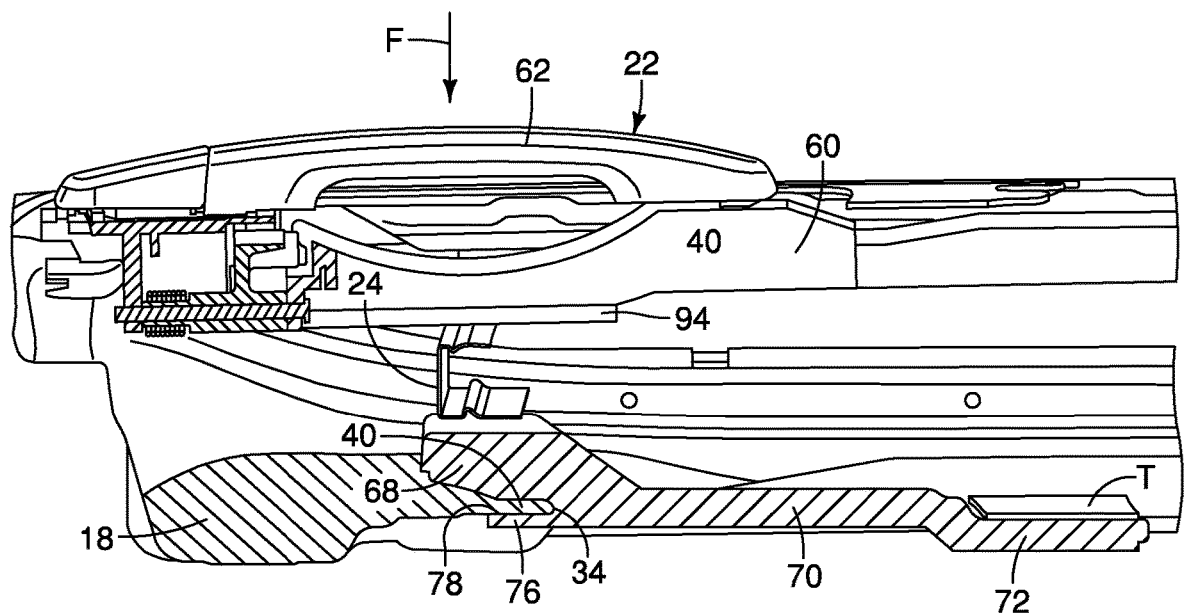
FIG. 18 is a top cross-sectional view of a portion of the rear door showing an impact receiving path defined by the outer door panel, the door handle assembly, the spacer material, the window track, the impact pad and the inner door panel in accordance with the exemplary embodiment.
Figure 19:
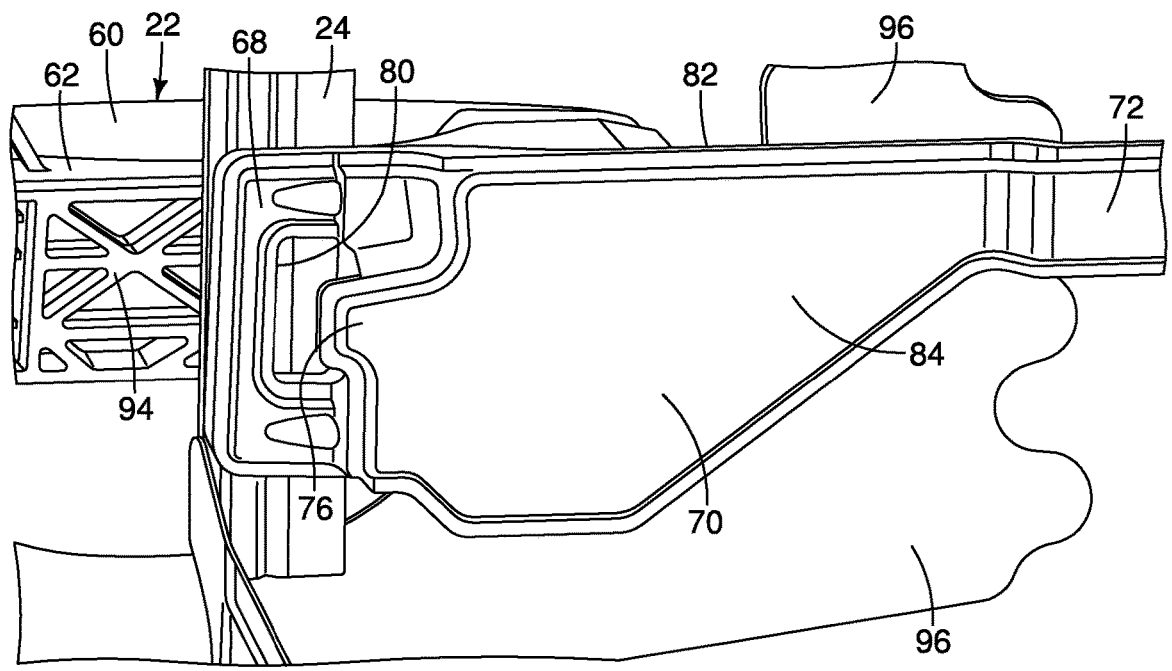
FIG. 19 is a perspective view of the impact pad showing the inboard surface of the impact pad, the window track and the door handle assembly in accordance with the exemplary embodiment.
Figure 20:
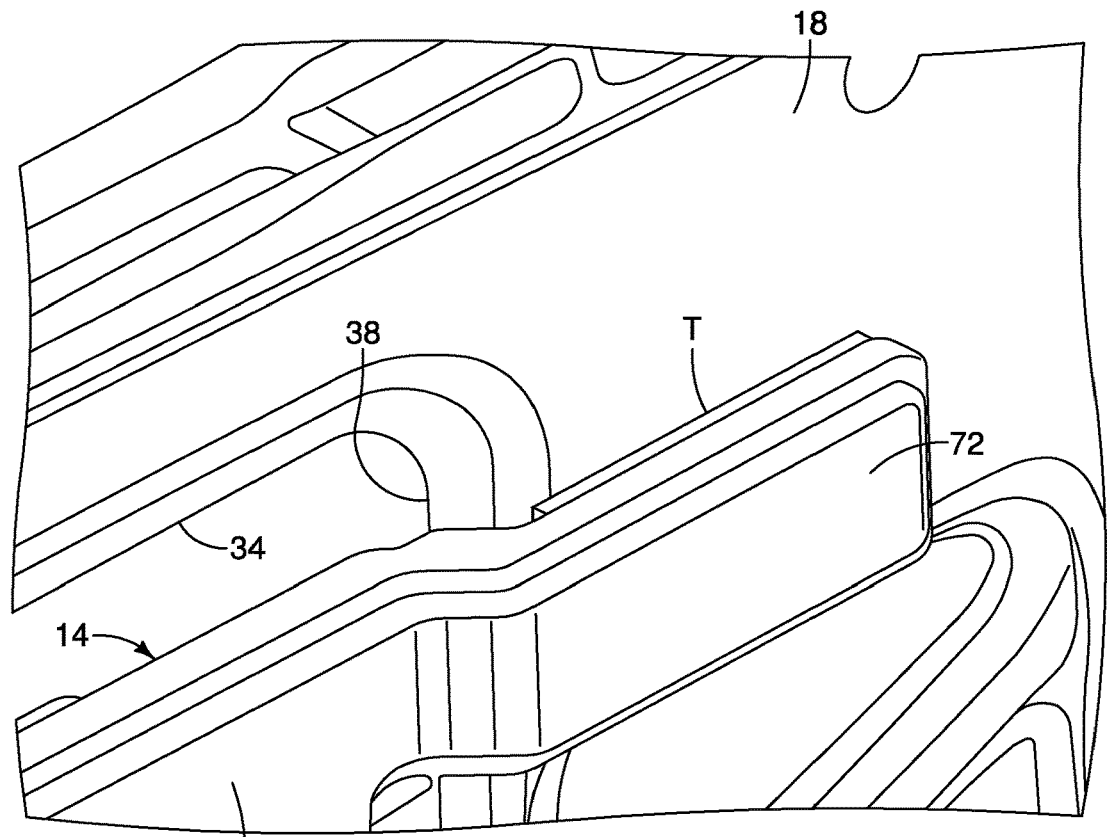
FIG. 20 is a perspective view of an inboard portion of the inner door panel showing the projecting portion of the impact pad attached to the inboard surface of the inner door panel via a strip of double sided tape in accordance with the exemplary embodiment.
Figure 21:
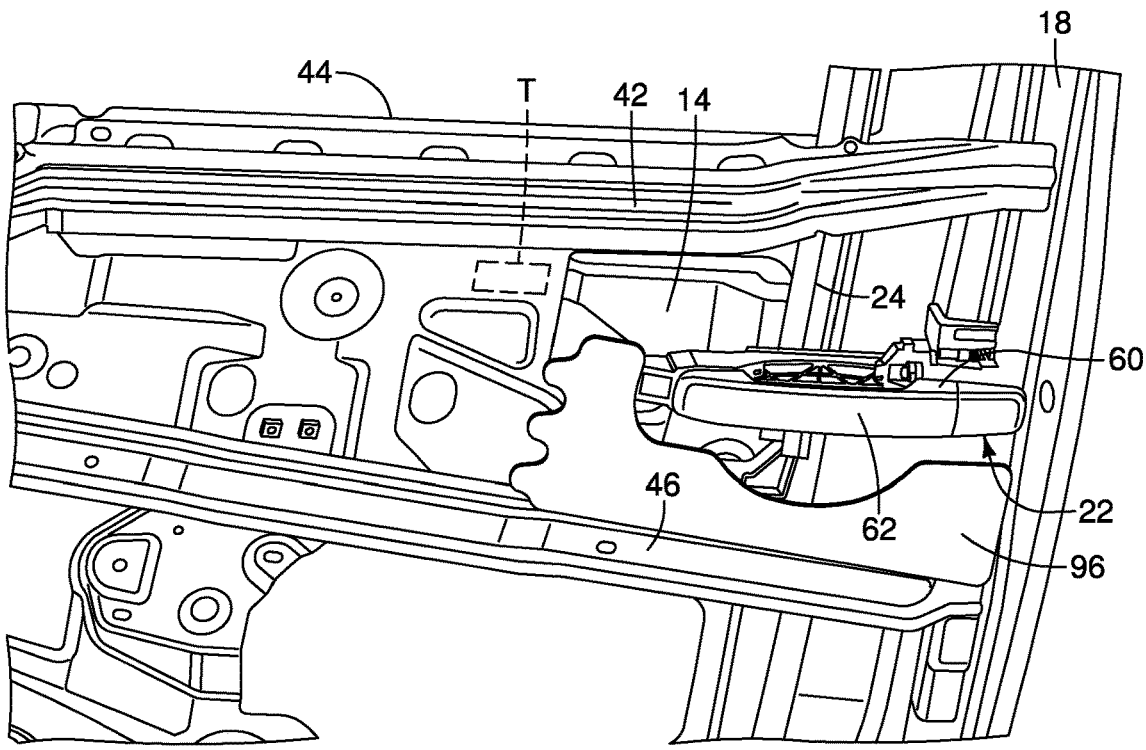
FIG. 21 is a perspective view of a portion of the outboard side of the inner door panel showing the impact pad installed thereto, the window track, the door handle assembly and the mastic material in accordance with the exemplary embodiment.

During assembly of the rear door 12, a mastic material 96 is applied to an inboard surface (not shown) of the outer door panel 20 at a location adjacent to the handle openings 52, as shown in FIG. 13. The mastic material 96 is for the purpose of dampening vibrations and/or rattles within the rear door 12. The mastic material 96 is located below the door handle assembly 22.

As is shown in FIGS. 5, 15, 18, 19 and 21, the window track 24 extends vertically between the base portion 60 of the door handle assembly 22 and the block portion 68 of the impact pad 14. Due to these relationships, the base portion 60 of the door handle assembly 22, the spacer material 94, the window track 24 and the block portion 68 of the impact pad 14 define an impact receiving path. The impact receiving path is such that in response to an impact event where impact force F (shown in FIG. 18) impacts the outer door panel 20 proximate the door handle assembly 22, the impact force F is transmitted from the outer door panel 20 to the base portion 60 and the spacer material 94 of the door handle assembly 22, then to and through the window track 24, to the block portion 68 of the impact pad 14 and finally to the inner door panel 18.

One advantage to the arrangement of the door handle assembly 22, the window track 24 and the impact pad 14 is that the impact force F more directly impacts a rearward area of the rear door 12 in its entirety. Consequently, the impact force F has less of an impact on the door handle assembly 22 itself. In the absence of the impact pad 14, the door handle assembly 22 is more likely to be deformed by the impact.

The various vehicle structures and elements, other than the above described features of the rear door 12, are conventional components that are well known in the art. Since such vehicle structures and elements are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door structure, comprising:
an inner door panel having an inboard surface and an outboard surface with an access opening that extends from the inboard surface to the outboard surface, the inner door panel having an outer periphery;
an outer door panel having an inboard surface and an outboard surface with a handle opening that extends from the inboard surface to the outboard surface, the outer door panel being fixed to a corresponding outer periphery of the inner door panel defining a cavity therebetween;
a door handle assembly having a base portion overlaying the inboard surface of the outer door panel within the cavity and a lever portion extending along the outboard surface of the outer door panel; and
an impact pad having a block portion, an attachment portion and a projecting portion that extends from the block portion, the block portion overlaying and contacting a portion of the outboard surface of the inner door panel adjacent to the access opening, the block portion being in vertical alignment with a portion of the base portion of the door handle, the projecting portion spanning a horizontally measured width of the access opening and the attachment portion extending from the block portion defining a slot therebetween, with a rearward edge of the inner door panel that defines the access opening extending into the slot upon installation of the impact pad to the inner door panel.

2. The vehicle door structure according to claim 1, wherein
the projecting portion of the impact pad extends forward from the block portion and has an attachment surface that attaches to a portion of the inboard surface of the inner panel adjacent to the access opening.

3. The vehicle door structure according to claim 2, wherein
the attachment surface of the projecting portion of the impact pad is attached to the inboard surface of the inner panel adjacent to the access opening via double sided tape.

4. The vehicle door structure according to claim 1, wherein
with the impact pad installed to the inner door panel, the block portion of the impact pad is located along the outboard surface of the inner door panel and at least a portion of the attachment portion extends along the inboard surface of the inner door panel.

5. A vehicle door structure, comprising
an inner door panel having an inboard surface and an outboard surface with an access opening that extends from the inboard surface to the outboard surface, the inner door panel having an outer periphery:
an outer door panel having an inboard surface and an outboard surface with a handle opening that extends from the inboard surface to the outboard surface, the outer door panel being fixed to a corresponding outer periphery of the inner door panel defining a cavity therebetween:
a door handle assembly having a base portion overlaying the inboard surface of the outer door panel within the cavity and a lever portion extending along the outboard surface of the outer door panel;
an impact pad having a block portion and a projecting portion that extends from the block portion, the block portion overlaying and contacting a portion of the outboard surface of the inner door panel adjacent to the access opening, the block portion being in vertical alignment with a portion of the base portion of the door handle and the projecting portion spanning a horizontally measured width of the access opening, and
a window regulator installed within the cavity and having at least one window track that extends vertically between the base portion of the door handle assembly and the block portion of the impact pad.

6. The vehicle door structure according to claim 5, wherein
the base portion of the door handle, the window track and the block portion of the impact pad define an impact receiving path such that in response to an impact event impacting the outer door panel proximate the door handle assembly impact force is transmitted from the outer door panel to the base portion of the door handle, then to and through the window track and to the block portion of the impact pad.

7. A vehicle door structure comprising:
an inner door panel having an inboard surface and an outboard surface with an access opening that extends from the inboard surface to the outboard surface, the inner door panel having an outer periphery;
an outer door panel having an inboard surface and an outboard surface with a handle opening that extends from the inboard surface to the outboard surface, the outer door panel being fixed to a corresponding outer periphery of the inner door panel defining a cavity therebetween;
a door handle assembly having a base portion overlaying the inboard surface of the outer door panel within the cavity and a lever portion extending along the outboard surface of the outer door panel; and
an impact pad having a block portion and a projecting portion that extends from the block portion, the block portion overlaying and contacting a portion of the outboard surface of the inner door panel adjacent to the access opening, the block portion being in vertical alignment with a portion of the base portion of the door handle and the projecting portion spanning a horizontally measured width of the access opening, the block portion of the impact pad having a first vertical dimension measured from the upper edge downward and the projecting portion of the impact pad having a second vertical dimension measured from the upper edge downward that is less than half of the first vertical dimension such that a lower edge of an attachment portion of the projecting portion is vertically above a lower edge of the block portion.

8. The vehicle door structure according to claim 7, wherein
a mid-section of the impact pad has a lower surface that is inclined and extends from the lower edge of the projecting portion to the lower edge of the block portion.

9. The vehicle door structure according to claim 8, wherein
the block portion of the impact pad includes an attachment portion that extends from the block portion defining a slot therebetween, with a rearward edge of the inner door panel that defines the access opening extends into the slot upon installation of the impact pad to the inner door panel.

10. The vehicle door structure according to claim 9, wherein
the projecting portion of the impact pad extends forward from the block portion and has an attachment surface that attaches to a portion of the inboard surface of the inner panel adjacent to the access opening.

11. The vehicle door structure according to claim 10, wherein
the attachment surface of the projecting portion of the impact pad is attached to the inboard surface of the inner panel adjacent to the access opening via double sided tape.

12. The vehicle door structure according to claim 9, wherein
with the impact pad installed to the inner door panel, the block portion of the impact pad is located along the outboard surface of the inner door panel and at least a portion of the attachment portion extends along the inboard surface of the inner door panel.

13. The vehicle door structure according to claim 9, further comprising
a window regulator installed within the cavity and having at least one window track that extends vertically between the base portion of the door handle assembly and the block portion of the impact pad.

14. The vehicle door structure according to claim 13, wherein
the base portion of the door handle, the window track and the block portion of the impact pad define an impact receiving path such that in response to an impact event impacting the outer door panel proximate the door handle assembly impact force is transmitted from the outer door panel to the base portion of the door handle, then to and through the window track and to the block portion of the impact pad.

* * * * *